Patented Feb. 22, 1927.

1,618,835

UNITED STATES PATENT OFFICE.

WALTER A. KUHNERT, OF LOS ANGELES, CALIFORNIA.

PROCESS FOR RECOVERY OF CARBONATE COMPOUNDS OF SODIUM AND BORAX FROM BRINES.

No Drawing.    Application filed August 20, 1925. Serial No. 51,510.

This invention relates to a process for treatment of natural brines containing carbonate salts of sodium, largely or wholly in the form of sodium carbonate and in sufficient concentration to permit of such treatment, and also containing borax, together with other alkali metal compounds, for the purpose of recovering carbonate compounds of sodium (either in the form of sesquicarbonate or bicarbonate or both) and borax (sodium tetraborate). The chief object of the invention is to provide for the economical recovery from the brine of such compounds separate from each other and substantially free from contamination by other constituents of the brine.

My invention has been applied particularly in connection with brines existing in Owens Lake, California, but is applicable generally to other brines consisting of complex salt solutions of substantially the same type and comprising the said constituents. In order to recover the borax from such brines it has been customary to first substantially completely remove the soda by introducing carbon dioxide to convert substantially all of the normal sodium carbonate to the less soluble sodium bicarbonate, which precipitates out, then concentrate if necessary, and then cool to cause precipitation of borax. This customary method is very inefficient however, from the standpoint of carbon dioxide consumption, not only because of the relatively large amount of carbon dioxide theoretically required to convert all of the sodium carbonate content to sodium bicarbonate, but also because the conversion of the last portions of sodium carbonate to bicarbonate is effected with some difficulty and requires the use of a considerable excess of carbon dioxide over that theoretically required, due to the low concentration of sodium carbonate remaining in the brine and the resulting slow rate of reaction. Furthermore, the bicarbonate precipitate obtained in this manner is usually of a very finely divided nature, rendering it difficult to remove from the solution by decantation, filtering, centrifuging, or otherwise. The difficulty of filtration is further increased by the fact that silicates and aluminates as well as organic matter are generally present in the brine, and that reaction products thereof, such as colloidal silica and alumina, are precipitated along with the sodium bicarbonate and thus render the separation even more difficult. Moreover these impurities are difficult to remove from the precipitate on account of the difficulty in washing the sodium bicarbonate owing to its finely divided condition. Furthermore, it is impossible, in such cases to effectively or completely remove the precipitated finely divided sodium bicarbonate from the mother liquor by decantation or centrifuging, in order to permit further treatment of such mother liquor for the recovery of borax, and if filtration is resorted to for the separation of this finely divided precipitate, the rate of filtration is so slow that a considerable part of the borax precipitates before completion of the filtration and is retained on the filter with the sodium bicarbonate and is thus lost and also contaminates the sodium bicarbonate.

It has also been customary to add sodium bicarbonate, obtained for example from the brine as above described, and either in dry form or in suspension in water or in solution, to a further quantity of fresh brine, which results in the formation of sodium sesquicarbonate due to the combination of the sodium bicarbonate with an equimolecular proportion or in some cases with other proportions of normal sodium carbonate, thus resulting in a further recovery of carbonate compounds of sodium from the brine. This has however required two successive operations, the first of which is open to the objections above described.

An important object of this invention is to recover carbonate compounds of sodium and borax from such brines with a minimum consumption of carbon dioxide and with a minimum number of operations, thus greatly reducing the cost of production of such materials. A particular object of the invention is to reduce the carbon dioxide consumption by removing only a portion of the carbonate compounds of sodium from the brine before removing the borax therefrom. Another object of the invention is to carbonate the brine in such manner as to obtain, during the carbonating operation, a precipitate of sodium sesquicarbonate instead of bicarbonate, thus still further decreasing the consumption of carbon dioxide as hereinafter described and obtaining the sesquicarbonate in one operation instead of in two successive operations as has heretofore been customary. Furthermore the sodium sesquicarbonate so produced is precipitated in the form of relatively coarse crystals which permit of easy separation from the brine by decantation, centrifuging, or filtering and are also very easily washed so that the sodium sesquicarbonate may easily be obtained in a state of high purity. Moreover the coarseness of the sodium sesquicarbonate crystals permits the greater part of the mother liquor to be separated therefrom by decantation, while the remainder may be rapidly separated by filtration, so that the entire body of mother liquor may be freed of precipitated solids before the crystallization of borax begins. Not only is the borax yield thus increased but contamination of the sesquicarbonate by borax is also prevented.

Another object of the invention is to employ a single carbonating operation which not only precipitates the carbonate compounds of sodium in the most advantageous manner but also leaves the brine, after the removal of such precipitated carbonate compounds of sodium, in such condition that upon simply cooling the same, preferably with agitation, and allowing it to stand a large percentage of the borax content of the brine crystallizes out of the solution and may be recovered therefrom substantially free from other constituents.

These objects I accomplish by first concentrating the brine if necessary, preferably by solar concentration, then carbonating the same by passing carbon dioxide bearing gas therethrough under certain controlled conditions of temperature and of concentration and rate of supply of carbon dioxide bearing gas thereto, so as to precipitate a certain percentage of the carbonate compounds of sodium largely or wholly in the form of sodium sesquicarbonate, separating the resultant precipitate from the mother liquor, and cooling such liquor and allowing the same to stand, preferably with agitation, to permit crystallization of borax therefrom.

I will describe my invention as applied to the treatment of a brine such as is found at Owens Lake, California, said brine being for example of the following composition, it being understood that the composition of the brine will change considerably from time to time owing to variations in inflow of water, evaporation, temperature, etc.

|  | Per cent. |
|---|---|
| Sodium (Na) by calculation | 13.16 |
| Potassium (K) | 1.735 |
| Silica ($SiO_2$) | 0.064 |
| Iron and aluminum oxides | trace |
| Chlorides (Cl) | 9.90 |
| Sulfates ($SO_4$) | 3.62 |
| Borates ($B_4O_7$) | 1.445 |
| Carbonates ($CO_3$) | 5.92 |
| Phosphates ($PO_4$) | 0.105 |
| Water and undetermined | 64.051 |
|  | 100.000 |

The percentages of the principal salts present in such a brine may be hypothetically calculated from the above analysis to be as follows:

|  | Per cent. |
|---|---|
| Sodium carbonate ($Na_2CO_3$) | 10.45 |
| Sodium borate ($Na_2B_4O_7$) | 1.865 |
| Sodium chloride (NaCl) | 13.75 |
| Sodium sulfate ($Na_2SO_4$) | 5.36 |
| Potassium chloride (KCl) | 3.30 |
| Sodium phosphate ($Na_2HPO_4$) | 0.158 |

This brine is concentrated by solar evaporation or otherwise to increase the percentage of borax to the desired value, that is to say to such a value that no appreciable amount of borax precipitates from the solution under these conditions while a maximum proportion of the borax may be recovered from such solution upon further treatment according to my process. The brine during such concentration may reach a condition of saturation with regard to its sodium carbonate constituent and some of the sodium carbonate may precipitate out, so that the relation between the percentage of borax and the percentage of sodium carbonate may be somewhat different in the concentrated brine than in the crude brine as taken from the lake. In other cases when the concentration of sodium carbonate in the brine is relatively low there may be no precipitation of sodium carbonate therefrom during such concentration. It may be stated that any suitable means of evaporation or concentration may be employed for this purpose but I prefer to use solar evaporation for the sake of economy. The conditions for such solar evaporation are excellent at Owens Lake. The solar concentration is preferably carried out in shallow vats or basins and a relatively high temperature may thus be maintained and in summer this temperature may be in the neighborhood of 100° F. The hot dry winds which prevail in this region also assist materially in the removal of water from the brine.

The resulting concentrated brine, which may contain for example as high as 13 to 15% anhydrous sodium carbonate and 3½% to 4½% anhydrous borax or the equivalent thereof is then pumped into any suitable receptacle or tank, and is subjected to the action of carbon dioxide obtained in any suitable manner, for example from a lime kiln or from a receptacle containing liquid carbon dioxide under pressure. The gases coming, for example, from the lime kiln and containing certain controlled proportions of carbon dioxide are pumped by means of any suitable blower, fan, or compressor into contact with the brine. In order to provide effective contact, the gas containing carbon dioxide may be forced into the body of brine under pressure so as to cause the gas to bubble up through the brine and thereby bring the carbon dioxide into intimate contact with the brine. The carbon dioxide is absorbed or reacts with the soda in its passage through the brine while the remaining inert gas serves to very thoroughly agitate the brine thus facilitating the reaction. This operation may be conducted in carbonating towers or tanks of the type ordinarily used for carbonation in the standard method of producing sodium bicarbonate, said towers being provided, for example, with perforated diaphragms or other baffle means at suitable intervals throughout the height thereof, so as to assist in the distribution of the gas and provide the highest degree of agitation of the brine and the most intimate contact between carbon dioxide and brine. In some cases however I may cause the brine to percolate downwardly through suitable towers over coke or other distributing means, and cause the gases to pass upwardly through the towers so as to provide countercurrent flow of the brine and carbon dioxide bearing gas. When using towers of this latter type the brine is rapidly circulated through the towers by pumping back the solution from the bottom of the towers to the top in a well-known manner. The towers used in the carbonation may be provided with suitable means for controlling the temperature of the brine; for example they may be provided with means for admitting steam thereto to heat the brine.

Heretofore in the recovery of carbonate compounds of sodium as sodium bicarbonate from brines of this character it has been usual to supply the carbon dioxide-bearing gas at a concentration of about 33% or more of carbon dioxide by volume, and it has also been customary to supply such gas at a relatively rapid rate of flow in proportion to the amount of brine so as to provide for relatively rapid conversion of the sodium carbonate to the form of bicarbonate. Under such conditions as these the precipitate is obtained substantially wholly in the form of sodium bicarbonate and in a very finely divided condition which gives rise to the objections above named. Furthermore the total amount of carbon dioxide consumed for the removal of a given amount of carbonate compounds of sodium from the brine according to such methods has been relatively high. It has been found in practice for example that when carbonating in this manner, the introduction of 5,000 pounds of carbon dioxide in a period of about 9 hours and at a substantially uniform rate, into 18,000 gallons of brine has resulted in a reduction of the sodium carbonate content of this amount of brine from 14% to 8%, while an additional carbonation period of about 18 hours, during which time approximately 10,000 pounds of additional carbon dioxide are introduced has been necessary to carry the carbonation to substantial completion and remove substantially all the sodium carbonate from the brine as has heretofore been considered necessary before removal of the borax therefrom. It will be seen therefore that the rate of carbonation according to this usual practice has been about 5,000 pounds of carbon dioxide in 9 hours for an 18,000 gallon batch of brine, and furthermore that it has been necessary under this method to use altogether about 15,000 pounds of carbon dioxide on this amount of brine before proceeding with the removal of borax therefrom.

I have found however that by suitably reducing the concentration of carbon dioxide in the gas used in carbonation or by reducing the rate of supply of such carbon dioxide bearing gas in proportion to the amount of brine, below the usual figures given above, or by reducing both the carbon dioxide content and the rate of supply of the gas, and by properly controlling the temperature, the precipitated carbonate compounds of sodium are obtained largely or wholly in the form of sodium sesquicarbonate. The precipitation of the carbonate compounds of sodium in this manner requires only one third as much carbon dioxide to effect a given reduction in the sodium carbonate content of the brine as is required when the soda is precipitated in the form of bicarbonate, as will be hereinafter explained, and furthermore the sesquicarbonate precipitate is in a comparatively coarse crystalline form which is well-adapted for separation from the mother liquor by decantation, centrifuging, or filtering, and is easily freed of residual mother liquor and other impurities by washing. I have also found that at the start of the carbonating operation a practically complete utilization of carbon dioxide is obtained, but that after the sodium carbonate content of the brine is reduced beyond a certain point the efficiency of utilization of the carbon dioxide decreases materially, and I have found further that an additional saving in carbon dioxide consumption may therefore be effected by discontinuing the carbonating operation at such a point that a considerable proportion of the sodium carbonate remains in solution in the brine and that a high efficiency of utilization of carbon dioxide still prevails. A greater proportionate removal of sodium carbonate from the brine on the basis of carbon dioxide consumed may thus be effected and at the same time the resulting brine may be treated for removal of a considerable proportion of its borax content. The exact point at which the carbonation should be stopped may vary with different brines or with variations in other conditions, but in most cases I prefer to stop before the sodium carbonate content of the brine is reduced below 3% and preferably before it is reduced below 5%, and in many cases I find it even more desirable to stop when the sodium carbonate content is reduced to about 8%.

I have obtained good results by carrying out the precipitation operation in the following manner: The carbon dioxide bearing gas coming from the lime kiln or other supply means is, if necessary, diluted with air or otherwise so as to present a concentration of about 23 to 28% of carbon dioxide, and this gas is brought into contact with the solution in the manner above described at a temperature of about 37° C. (or say from 30° C. to 45° C.), the carbonation of the brine in this manner being conducted for about 12 hours, with the result that a portion of the carbonate compounds of sodium are precipitated during carbonation in the form of sesquicarbonate and the sodium carbonate in solution is reduced from say about 14% to about 8% or less. The reduction of the sodium carbonate content of 18,000 gallons of brine from 14% to 8% requires, by my process, about 1700 pounds of carbon dioxide, as against 5000 pounds required to effect an equal recovery of soda from this brine by the ordinary method above referred to. The concentration of carbon dioxide in the gas and the rate of supplying such gas to the brine may therefore be such as to provide about 1700 pounds of carbon dioxide in 12 hours for each 18,000 gallons of brine although this rate of supplying carbon dioxide may of course be varied somewhat in some instances. The liquor is then passed through suitable separating means, such as decantation or settling tanks, and centrifuging or filtering apparatus, or both, for separation from the mother liquor of the precipitated sodium sesquicarbonate along with any sodium bicarbonate which may be precipitated in the carbonating operation. It is desirable however to regulate the concentration and rate of flow of carbon dioxide bearing gas in such manner that the amount of sesquicarbonate precipitated will be at a maximum and the amount of bicarbonate precipitated will be a minimum, so as to obtain a maximum economy in the consumption of carbon dioxide, and also permit recovery of the precipitate in a coarsely crystalline condition, thereby facilitating the separating and washing operations.

The sesquicarbonate precipitated and separated from the brine as above described is marketable as such or it may be readily converted, if desired, to any of the standard soda compounds such as soda ash, sodium hydroxide, etc. The remaining brine or mother liquor, after separation of the precipitated material therefrom is passed to vats or tanks where it is cooled to a suitable temperature, for example to 20° C. or below, and agitated from time to time for a period of two to three days. The cooling may be accomplished in any suitable manner, for example by spraying in spray cooling apparatus, or by cooling towers, or by circulating suitable cooling medium such as cold brine through cooling coils in said tanks or vats, and the agitating may be accomplished either in said tanks or vats in any suitable manner or by circulating the solution from time to time from the vats through suitable agitating means and back to the vats again, or otherwise. Upon cooling in this manner a substantial portion of the borax content of the brine is precipitated as crude borax, the amount so recovered being for example 50% to 75% or more of the original borax content of the brine. As a particular example, the borax concentration of certain concentrated brines, when treated in this manner, has been reduced from about 4½% anhydrous borax to about 1½%. The resulting precipitated crude borax is then separated from the mother liquor by decantation, filtration or otherwise, redissolved in warm water, filtered to free the solution from impurities such as alumina and silica precipitated along with the borax, and is then finally recrystalized as pure borax and dried.

The carbonating operation acts to decrease the solubility of the borax and cause the same to precipitate upon cooling the solution, but I do not wish to be limited to any particular theoretical explanation of this action. It is known, however, that silica, sodium silicate, and sodium aluminate are present in the brine, and these substances may act to inhibit the precipitation of the borax so that the crude brine contains a larger proportion of borax in solution than will remain in solution after their removal. Other ingredients such as sodium sulfide and organic matter may also have some similar effect in holding the borax in solution. If such is the case then the precipitation of the silica and alumina and possibly also the removal or decomposition of sodium sulphide, organic matter, etc., during and following the carbonating operation removes the factors holding borax in solution so that upon subsequent cooling of the solution the borax precipitates out. As evidence in support of this theory I have found that only brines containing such silica, etc., appear to be capable of maintaining the high borax solubility found in this concentrated brine, and also that whenever the brine is treated to remove such constituents therefrom, the borax solubility is reduced. On the other hand, it may be that the borax is present in the original brine partly in the form of sodium metaborate instead of sodium tetraborate. The metaborate salt is much more soluble in water than the tetraborate and the presence of this salt may account for the high borax content of the brine. According to this explanation the sodium metaborate is converted to the less soluble tetraborate during carbonation as indicated in the equation—

$$4NaBO_2 + CO_2 = Na_2B_4O_7 + Na_2CO_3$$

and the resulting tetraborate crystallizes out as borax upon cooling and allowing the solution to stand. In any event a single carbonation of the brine serves to remove therefrom a portion of the soda content and also leaves the brine in such condition that upon cooling of the same a considerable proportion of the borax content crystallizes out.

The rate of supplying carbon dioxide to the brine may be reduced below the usual practice either by reducing the concentration of carbon dioxide in the gas or by reducing the rate of flow of such gas, for example by reducing the pressure or the volumetric rate of flow at which it is supplied, so as to effect the desired reduction in the rate at which carbon dioxide is brought into contact with sodium carbonate in solution, and thus cause the production of sodium sesquicarbonate instead of sodium bicarbonate. Or, as in the example above given, both the concentration and the rate of flow may be diminished. The carbon dioxide bearing gas used in my process, when produced by the operation of a lime kiln will, in general, contain in addition to the carbon dioxide, a large amount of nitrogen and small amounts of other gases. It may be stated that in general for production of about 18½ tons of carbon dioxide, about 30 tons of limestone and about 3 tons of coke (85% C.) will be used and the carbon dioxide in the gas is obtained partly from the limestone and partly from the coke. The carbon dioxide bearing gas so produced may contain a higher concentration of carbon dioxide than is desirable for carrying out my improved process as above described, and may in such case be diluted by admitting air or other diluting gas thereto at any desired stage of the operation, for example after the gas has passed through the ordinary scrubbers and before it passes to the pump or blower for forcing it into contact with the brine.

In addition to the above-mentioned mechanical advantages of my process over the ordinary methods of removing carbonate compounds of sodium by precipitation as sodium bicarbonate, such advantages resulting principally from the coarsely crystalline condition of the precipitate obtained by my process, I obtain the further advantage of a reduction to about one third in the carbon dioxide consumption as compared with such other methods for an equal reduction in sodium carbonate content of the brine (for example a reduction from 5000 pounds to 1700 pounds in the particular case above discussed). The reason for this reduction in the carbon dioxide required to remove a given amount of carbonate compounds of sodium from the brine is evident from the following equations, in which the water of crystallization is disregarded for the purpose of simplification:

I. $Na_2CO_3 + CO_2 + H_2O = 2NaHCO_3$.
II. $3Na_2CO_3 + CO_2 + H_2O = 2(Na_2CO_3 \cdot NaHCO_3)$.

Equation No. I represents the reaction ordinarily obtained in the precipitation of sodium bicarbonate and it will be seen from this equation that one molecular equivalent of carbon dioxide is required for each molecular equivalent of sodium carbonate removed from the brine. Equation No. II represents the reaction involved in the precipitation of sodium sesquicarbonate and it is seen that in this case one molecular equivalent of carbon dioxide is sufficient to convert three molecular equivalents of sodium carbonate to the form of sesquicarbonate in which it is precipitated. By means of my invention therefore, for a given consumption of carbon dioxide, three times as much sodium carbonate is removed from the brine and made available for use or for sale as is the case with the former methods, in addition to the further saving of carbon dioxide obtained by stopping the carbonating operation while the brine still contains an appreciable amount of sodium carbonate in solution, and while a high efficiency of utilization of the carbon dioxide is still obtained.

In my process as above described the formation of sesquicarbonate may take place directly as indicated in equation No. II above or it may consist in two steps: First, the formation of bicarbonate, and second the reaction of such bicarbonate, during the carbonation, with an equi-molecular proportion of normal carbonate to form sesquicarbonate.

It has been known heretofore to carbonate solutions containing sodium carbonate in such manner as to obtain a precipitate of bicarbonate and then to add the precipitated bicarbonate (either in solid form or as a suspension in water) to a further quantity of sodium carbonate solution so as to cause precipitation of sesquicarbonate. But it has never been known before to my knowledge to so carry out the carbonation that both of these operations are performed at the same time. I have found however that by sufficiently reducing the rate of supplying carbon dioxide to the brine for example as above described (that is to say by supplying, for example, only about 1700 pounds of carbon dioxide in 12 hours, as against 5000 pounds ordinarily supplied in 9 hours, for 18,000 gallons of brine) and properly controlling the temperature during carbonation, the precipitate may be obtained principally or wholly in the form of sesquicarbonate and if it be assumed that the formation of sesquicarbonate takes place in two steps as above mentioned then it is apparent that the precipitation of sesquicarbonate instead of bicarbonate is due to the lower rate of carbonation which permits the bicarbonate as formed, and before reaching a sufficient concentration to cause precipitation thereof as such, to react with an equi-molecular proportion of normal carbonate and form sesquicarbonate which precipitates out.

I claim:

1. The process of recovering carbonate compounds of sodium and borax from complex brines containing sodium carbonate and borax in solution, which comprises bringing the brine at a temperature between 30° C. and 45° C. into contact with carbon dioxide bearing gas, the concentration of sodium carbonate in the brine being sufficiently high, and the concentration of carbon dioxide in the gas and the rate of flow of the gas being such as to provide a sufficiently low rate of supply of carbon dioxide to the brine, to produce during such treatment a precipitate consisting largely of sodium sesquicarbonate, separating the precipitate so formed from the solution, cooling such solution for a sufficient length of time to cause precipitation of borax therefrom, and separating the borax so precipitated from the solution.

2. The process of recovering carbonate compounds of sodium and borax from complex brines containing sodium carbonate and borax, which comprises carbonating such brine at a temperature between 30° C. and 45° C. with gas containing carbon dioxide, the concentration of carbon dioxide in such gas being less than 33% so as to cause precipitation of sodium sesquicarbonate during such carbonating operation, separating the sodium sesquicarbonate so precipitated from the solution, cooling the solution to cause precipitation of borax therefrom, and separating the precipitated borax from the solution.

3. The process of recovering carbonate compounds of sodium and borax from complex brines containing sodium carbonate and borax which comprises carbonating such brine with gas containing from 23 to 28% of carbon dioxide while maintaining the brine at a temperature between 30° and 45° C., said gas being supplied to the brine at such a rate that the rate of supply of carbon dioxide relative to the amount of brine is sufficiently low to cause precipitation of sodium sesquicarbonate at such temperature during the carbonating operation, separating the sodium sesquicarbonate so precipitated from the brine, cooling the brine to cause precipitation of borax therefrom and separating the borax so precipitated.

4. The process of recovering carbonate compounds of sodium and borax from complex brines containing sodium carbonate and borax, which comprises carbonating such a brine at a temperature between 30° C. and 45° C. with gas containing carbon dioxide to cause precipitation therefrom during such carbonating operation of carbonate compounds of sodium of less solubility than normal sodium carbonate, and to decrease the solubility of the borax in said brine, discontinuing such carbonating operation while an appreciable portion of the sodium carbonate still remains in solution as such, separating the precipitated carbonate compounds of sodium from the brine, cooling the brine to cause precipitation of borax therefrom, and separating such precipitated borax from the brine.

5. The process of recovering carbonate compounds of sodium and borax from complex brines containing sodium carbonate and borax, which comprises carbonating such brine at a temperature between 30° and 45° C. with gas containing carbon dioxide to cause precipitation therefrom during such carbonating operation of carbonate compounds of sodium, other than normal sodium carbonate, in sufficient amount to reduce the content of sodium carbonate in the brine sufficiently to permit precipitation of borax alone free from carbonate compounds of sodium upon subsequent cooling of such brine, removing the precipitated carbonate compounds of sodium, cooling the brine to cause precipitation of borax therefrom, and separating the precipitated borax from the brine.

6. The process of recovering carbonate compounds of sodium and borax from complex brines containing sodium carbonate and borax which consists in carbonating such a brine at a temperature between 30° C. and 45° C. with gas containing carbon dioxide to cause precipitation therefrom during such carbonating operation of carbonate compounds of sodium other than normal sodium carbonate, discontinuing such carbonating operation while the brine still contains an appreciable amount of sodium carbonate in solution, and while a high efficiency of utilization of the carbon dioxide is still obtained, separating the precipitated carbonate compounds of sodium from the brine, cooling such brine to cause precipitation of borax therefrom, and removing the precipitated borax from the brine.

7. The process of recovering carbonate compounds of sodium and borax from complex brines containing sodium carbonate and borax which comprises concentrating such a brine to increase the anhydrous borax content thereof to approximately $3\frac{1}{2}$ to $4\frac{1}{2}\%$, carbonating the concentrated brine at a temperature between 30° C. and 45° C. with gas containing carbon dioxide to cause precipitation therefrom during such carbonating operation of carbonate compounds of sodium other than normal sodium carbonate, discontinuing such carbonating operation while the brine still contains at least 5% sodium carbonate in solution, removing from the brine the precipitated carbonate compounds of sodium, cooling the brine and allowing the same to stand to precipitate borax therefrom and removing the borax so precipitated from the brine.

8. The process of recovering carbonate compounds of sodium and borax from complex brines containing sodium carbonate and borax which comprises concentrating such a brine to increase the anhydrous borax content thereof to approximately $3\frac{1}{2}$ to $4\frac{1}{2}\%$, carbonating the concentrated brine at a temperature between 30° C. and 45° C. with gas containing carbon dioxide at such a rate of supply of gas and concentration of carbon dioxide therein to cause precipitation during such carbonating operation of carbonate compounds of sodium other than normal sodium carbonate, discontinuing such carbonating operation while the brine still contains about 8% sodium carbonate in solution, removing from the brine the precipitated carbonate compounds of sodium, cooling the brine and allowing the same to stand to precipitate borax therefrom and removing the borax so precipitated from the brine.

9. The process of recovering carbonate compounds of sodium and borax from complex brines containing sodium carbonate and borax which comprises carbonating such a brine at a temperature between 30° C. and 45° C. with gas containing carbon dioxide, the concentration of sodium carbonate in the brine being sufficiently high, and the concentration of carbon dioxide in the gas and the rate of flow of the gas being such as to provide a sufficiently low rate of supply of carbon dioxide to the brine, to produce during such carbonating operation a precipitate consisting largely of sodium sesquicarbonate, discontinuing such carbonating operation while the brine still contains an appreciable amount of sodium carbonate in solution and while a high efficiency of utilization of the carbon dioxide is still obtained, separating the resulting precipitate from the brine, cooling the brine and allowing the same to stand to cause precipitation of borax therefrom, and removing the borax so precipitated from the brine.

In testimony whereof I have hereunto subscribed my name this 10th day of August, 1925.

WALTER A. KUHNERT.